United States Patent
Baessler et al.

(10) Patent No.: US 12,189,695 B2
(45) Date of Patent: Jan. 7, 2025

(54) RANDOM SAMPLING FROM A SEARCH ENGINE

(71) Applicant: International Business Machines Corporation, Armonk, NY (US)

(72) Inventors: Michael Baessler, Bempflingen (DE); Thomas Hampp-Bahnmueller, Stuttgart (DE); Jojo Joseph, Bengaluru (IN); Pavlo Petrenko, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/469,820

(22) Filed: Sep. 19, 2023

(65) Prior Publication Data

US 2024/0004939 A1 Jan. 4, 2024

Related U.S. Application Data

(63) Continuation of application No. 16/736,124, filed on Jan. 7, 2020, now Pat. No. 11,797,615.

(30) Foreign Application Priority Data

Jul. 2, 2019 (EP) .................................... 19183755

(51) Int. Cl.
*G06F 16/00* (2019.01)
*G06F 7/58* (2006.01)
(Continued)

(52) U.S. Cl.
CPC ............. *G06F 16/951* (2019.01); *G06F 7/58* (2013.01); *G06F 16/907* (2019.01); *G06F 16/9537* (2019.01); *G06F 16/986* (2019.01)

(58) Field of Classification Search
CPC ........ G06F 16/951; G06F 7/58; G06F 16/907; G06F 16/9537; G06F 16/986
(Continued)

(56) References Cited

U.S. PATENT DOCUMENTS

| 8,095,419 | B1 | 1/2012 | Kapur |
| 8,166,203 | B1 | 4/2012 | Yang |

(Continued)

FOREIGN PATENT DOCUMENTS

| CN | 102687137 A | 9/2012 |
| CN | 102750386 A | 10/2012 |

(Continued)

OTHER PUBLICATIONS

"Random Sampling From a Search Engine", PCT Application No. IB2020/056210, filed on Jul. 1, 2020, 51 pages.
(Continued)

*Primary Examiner* — Irete F Ehichioya
*Assistant Examiner* — Shirley D Hicks
(74) *Attorney, Agent, or Firm* — Joseph P. Curcuru

(57) ABSTRACT

A method for providing one or more random sample documents from a corpus of documents using a search engine is provided. The providing of each of the random sample documents comprises selecting randomly a time window from a set of time windows. A search query is sent to the search engine defining a search for documents of the corpus with time-stamps within the time window defined by the randomly selected time window. In response to the sending of the search query, a search result is receiving from the search engine. The search result comprises a set of the documents of the corpus with time-stamps within the time window. One of the documents comprised by the received set of documents is then selected randomly.

24 Claims, 6 Drawing Sheets

(51) Int. Cl.
  *G06F 16/907* (2019.01)
  *G06F 16/951* (2019.01)
  *G06F 16/9537* (2019.01)
  *G06F 16/958* (2019.01)

(58) Field of Classification Search
  USPC .................................................. 707/600–899
  See application file for complete search history.

(56) References Cited

U.S. PATENT DOCUMENTS

| | | | |
|---|---|---|---|
| 8,316,009 | B2 | 11/2012 | Fraser |
| 9,269,053 | B2 | 2/2016 | Naslund |
| 9,411,889 | B2 | 8/2016 | Zhu |
| 9,785,634 | B2 * | 10/2017 | Puzicha ............... G06Q 10/103 |
| 9,836,623 | B2 | 12/2017 | Carasso |
| 10,552,468 | B2 * | 2/2020 | Ciulla .................. G06F 16/353 |
| 10,761,813 | B1 | 9/2020 | Echeverria |
| 11,797,615 | B2 * | 10/2023 | Baessler ............... G06F 16/986 |
| 2009/0006438 | A1 | 1/2009 | Tunkelang |
| 2011/0040784 | A1 | 2/2011 | Rousseau |
| 2011/0119269 | A1 | 5/2011 | Agrawal |
| 2014/0081961 | A1 * | 3/2014 | Srikrishna ........... G06F 16/3322 |
| | | | 707/723 |
| 2014/0280034 | A1 | 9/2014 | Harris |
| 2014/0317334 | A1 | 10/2014 | Gadsing |
| 2016/0328432 | A1 | 11/2016 | Raghunathan |
| 2016/0364489 | A1 | 12/2016 | Gupta |
| 2017/0139963 | A1 | 5/2017 | Baum |
| 2017/0293653 | A1 | 10/2017 | Harris |
| 2018/0121539 | A1 | 5/2018 | Ciulla |
| 2018/0137169 | A1 | 5/2018 | Zhao |
| 2021/0004417 | A1 | 1/2021 | Baessler |

FOREIGN PATENT DOCUMENTS

| | | |
|---|---|---|
| CN | 104424327 A | 3/2015 |
| CN | 104484627 A | 4/2015 |
| CN | 106295793 A | 1/2017 |
| CN | 106682024 A | 5/2017 |
| CN | 107291719 A | 10/2017 |
| CN | 107748766 A | 3/2018 |
| CN | 109039428 A | 12/2018 |
| CN | 114072788 A | 2/2022 |
| DE | 112020002465 T5 | 2/2022 |
| JP | 2014519633 A | 8/2014 |
| WO | 2012149378 A1 | 11/2012 |
| WO | 2021001761 A1 | 1/2021 |

OTHER PUBLICATIONS

Bar-Yossef et al., "Efficient Search Engine Measurements", WWW 2007 / Track: Search, Session: Search Potpourri, WWW 2007, May 8-12, 2007, Banff, Alberta, Canada, pp. 401-410.

Bar-Yossef et al., "Random Sampling from a Search Engine's Index", WWW 2006, May 23-26, 2006, Edinburgh, Scotland, ACM 1-59593-323-9/06/0005, 10 pages.

Bar-Yossef et al., "Random Sampling from a Search's Engine Index*", *A preliminary version of this paper appeared in the proceedings of the 15th International World-Wide Web Conference (WWW2006), 78 pages.

Bassler et al., "Random Sampling From a Search Engine" European Patent Application No. EP19183755.8, filed on Jul. 2, 2019, 51 pages.

Bharat et al., "A technique for measuring the relative size and overlap of public Web search engines", Estimating the Relative Size and Overlap of Public Web Search Engines, Digital, Systems Research Center, Palo Alto, CA, 12 pages, Oct. 6, 2004.

Broder et al., "Estimating Corpus Size via Queries", CIKM'06, Nov. 5-11, 2006, Arlington, Virginia, USA, pp. 594-603.

Chenggai, Guo, "Research on Multidimensional Data Query Processing based on User Preferences", Thesis for Master of Engineering, Nanjing University of Aeronautics and Astronautics, Mar. 2018, English Abstract only, 80 pages.

Hui, Liu, "Research on Key Technologies of Column-Oriented Database for Big Data", Dissertation for Doctor of Philosophy, Xidian University, Jun. 2017, English Abstract only, 120 pages.

Patent Cooperation Treaty (PCT), International Search Report, Oct. 21, 2020, Applicant's or agent's file reference, International application No. PCT/IB2020/056210, Date of the actual completion of the international search Sep. 28, 2020, Date of mailing of the international search report Oct. 21, 2020, 3 pages.

Patent Cooperation Treaty (PCT), Written Opinion of the International Searching Authority, Oct. 21, 2020, Applicant's or agent's file reference, International application No. PCT/IB2020/056210, 4 pages.

Qu Zhijian et al., "Double column family storage design for massive data of power quality online monitoring system," Power System Protection and Control, vol. 47, No. 2, Jan. 16, 2019. DOI: 10.7667/PSPC180143.

Taelman et al., "Triple storage for random-access versioned querying of RDF archives," Web Semantics: Science, Services and Agents on the World Wide Web 54 (2019) 4-28. https://doi.org/10.1016/j.websem.2018.08.001.

Xu, et al., "Building Confidential and Efficient Query Services in the Cloud with RASP Data Perturbation", IEEE Transactions on Knowledge and Data Engineering, vol. 26, No. 2, Feb. 2014, pp. 322-335.

Youtube, "Random Sampling from a Search's Engine Index:", Video, Google Tech Talks, Aug. 17, 2006, GoogleTalksArchive, Published on Aug. 22, 2012, 2 pages, <https://www.youtube.com/watch?v=wl2urLK719E>.

List of IBM Patents or Patent Applications Treated as Related, Filed herewith, 2 pages.

Fumitaka Urano, et al., Time lag correlation analysis between SNS Information, IEICE Technical Report, vol. 116, No. 213, The Institute of Electronics, Information and Communication Engineers, Sep. 1, 2016, pp. 79-84. (Abstract only).

* cited by examiner

RANDOM SAMPLING FROM A SEARCH ENGINE

BACKGROUND

The present invention relates generally to the field of electronic data processing and, more specifically, to a statistically random sampling from a search engine.

Z. Bar-Yossef and M. Gurevich, "Random sampling from a search engine's index", in Journal of the ACM, vol. 55, issue 5, article no. 24, 2008, describe an approach for sampling random documents from a corpus of documents indexed by a search engine, using only a public interface of the search engine. Random queries are formulated and submitted to a search engine. From the result sets returned uniformly chosen documents are picked. In order to construct the random queries, a lexicon of terms appearing in the documents of the corpus searched is required. Each term in the lexicon is accompanied by an estimate of its frequency. A random query is formulated by randomly selecting terms from the lexicon as search terms, based on their estimated frequencies and taking their conjunction or disjunction. The lexicon is constructed in a pre-processing step by crawling the corpus of documents.

The technique of Bar-Yossef and Gurevich has the disadvantage of favoring long documents, because such documents due to their richer content in general match many more random queries than shorter documents. Another problem is that public search engines in general do not allow access to the full list of results for a query, but rather only to a predefined maximum number of results, i.e., the top N results. Thus, for random queries with more than N possible results the Bar-Yossef and Gurevich approach is biased towards documents with a high static rank within the top N search results. This may in particular be the case for queries with disjunctive combinations of random search terms. To alleviate this problem, the Bar-Yossef and Gurevich approach uses estimated term frequencies to choose queries that are unlikely to return more than N results. However, with the number of documents of a corpus of documents indexed by a search engine growing by orders of magnitude, while N is in general being kept constant, this solution for query selection becomes ineffective. It may rather be almost impossible to find random terms such that disjunctive queries comprising these random terms return less than N results. If disjunctive queries with less than N results are found, using these queries may have the disadvantage that only a small sunset of the corpus is actual sampled. Even though it is easier to construct conjunctive queries with less than N results by increasing the number of random terms comprised by the queries, using more random terms increases the bias towards longer documents increases, in particular towards documents with a large variety of terms, like dictionaries and word lists.

Another disadvantage with the Bar-Yossef and Gurevich approach is that it is expensive to produce a true random sample, in particular from a multi-lingual large corpus, remains. It may take millions of invocations of a search interface to get a random sample.

SUMMARY

Various embodiments provide a method for providing one or more random sample documents from a corpus of documents using a search engine interface of a search engine as well as a computer program product and a computer system for executing the method as described by the subject matter of the independent claims. Advantageous embodiments are described in the dependent claims. Embodiments of the present invention can be freely combined with each other if they are not mutually exclusive.

In one aspect, the invention relates to a method for providing one or more random sample documents from a corpus of documents using a search engine. The search engine includes a search index for the corpus of documents. Each of the documents of the corpus is assigned with a time-stamp.

The method comprises determining a timeframe of interest. The one or more random sample documents are provided. The time-stamp of each of the random sample documents is within the timeframe of interest.

The providing of each of the random sample documents comprises selecting randomly a time window from a set of time windows dividing up the timeframe of interest. For each of the time windows the number of documents comprised by the corpus with time-stamps within the respective time window satisfies a first predefined criterion. A search query is sent to the search engine for execution using the search index. The search query is for documents of the corpus with time-stamps within the time window. In response to the sending of the search query, a search result is received from the search engine. The search result identifies a set of documents of the corpus with time-stamps within the time window. One of the documents comprised by the received set of documents is selected randomly.

According to embodiments, for the random selecting of the time-based buckets the method further comprises determining first time-based buckets of a first subset of the set of time-based buckets using first search queries. The determining of each of the first time-based buckets comprises selecting a first time window within the timeframe of interest with a predefined width. A first search query defining a search for documents of the corpus with time-stamps within the first time window is generated. The first search query is sent to the search engine interface for execution by the search engine using the search index. In response to the sending of the first search query, a first search result is received from the search engine interface. The first search result comprises a set of documents of the corpus with time-stamps within the first time window defined by the first search query. If the received first search result satisfies the first predefined criterion regarding the number of documents to be comprised by the time-based buckets, the first time-based bucket comprising a definition of the first time window used by the first search query is generated. Else the first time window is adjusted and a further search is executed using an adjusted first search query with the adjusted first time window.

According to embodiments, the random selecting of the time windows further comprises predicting second time windows of a second subset of time windows, using the first windows, such that all of the predicted second time windows satisfy the first predefined criterion.

According to embodiments, the method further comprises checking whether the received search result satisfies a second predefined criterion regarding the number of documents comprised by the search result. If the second predefined criterion is not satisfied, the width of the time window defined by the randomly selected time window is adjusted.

According to embodiments, the method further comprises performing a statistical analysis using the one or more random sample documents provided.

In a further aspect, the invention relates to a computer program product comprising a non-volatile computer-readable storage medium having machine-executable program instructions embodied therewith for providing one or more random sample documents from a corpus of documents using a search engine. The search engine includes a search index for the corpus of documents. Each of the documents of the corpus is assigned with a time-stamp.

Execution of the program instructions by a processor of a computer causes the processor to control the computer system to determine a timeframe of interest. The one or more random sample documents are provided. The time-stamp of each of the random sample documents is within the timeframe of interest.

The providing of each of the random sample documents by the program instructions comprises selecting randomly a time window from a set of time windows dividing up the timeframe of interest. For each of the time windows the number of documents comprised by the corpus with time-stamps within the respective time window satisfies a first predefined criterion. A search query is sent to the search engine for execution using the search index. The search query is for documents of the corpus with time-stamps within the time window. In response to the sending of the search query, a search result is received from the search engine. The search result identifies a set of documents of the corpus with time-stamps within the time window. One of the documents comprised by the received set of documents is selected randomly.

In a further aspect, the invention relates to a computer system for providing one or more random sample documents from a corpus of documents using a search engine. The search engine comprises a search index for the corpus of documents. Each of the documents of the corpus is assigned with a time-stamp. The computer system comprises a processor and a memory storing machine-executable program instructions.

Execution of the program instructions by the processor causes the processor to control the computer system to determine a timeframe of interest. The one or more random sample documents are provided. The time-stamp of each of the random sample documents is within the timeframe of interest.

The providing of each of the random sample documents by the program instructions comprises selecting randomly a time window from a set of time windows dividing up the timeframe of interest. For each of the time windows the number of documents comprised by the corpus with time-stamps within the respective time window satisfies a first predefined criterion. A search query is sent to the search engine for execution using the search index. The search query is for documents of the corpus with time-stamps within the time window. In response to the sending of the search query, a search result is received from the search engine. The search result identifies a set of documents of the corpus with time-stamps within the time window. One of the documents comprised by the received set of documents is selected randomly.

BRIEF DESCRIPTION OF THE DRAWINGS

In the following, embodiments of the invention are explained in greater detail, by way of example only, making reference to the drawings in which.

DETAILED DESCRIPTION

Figure 1:
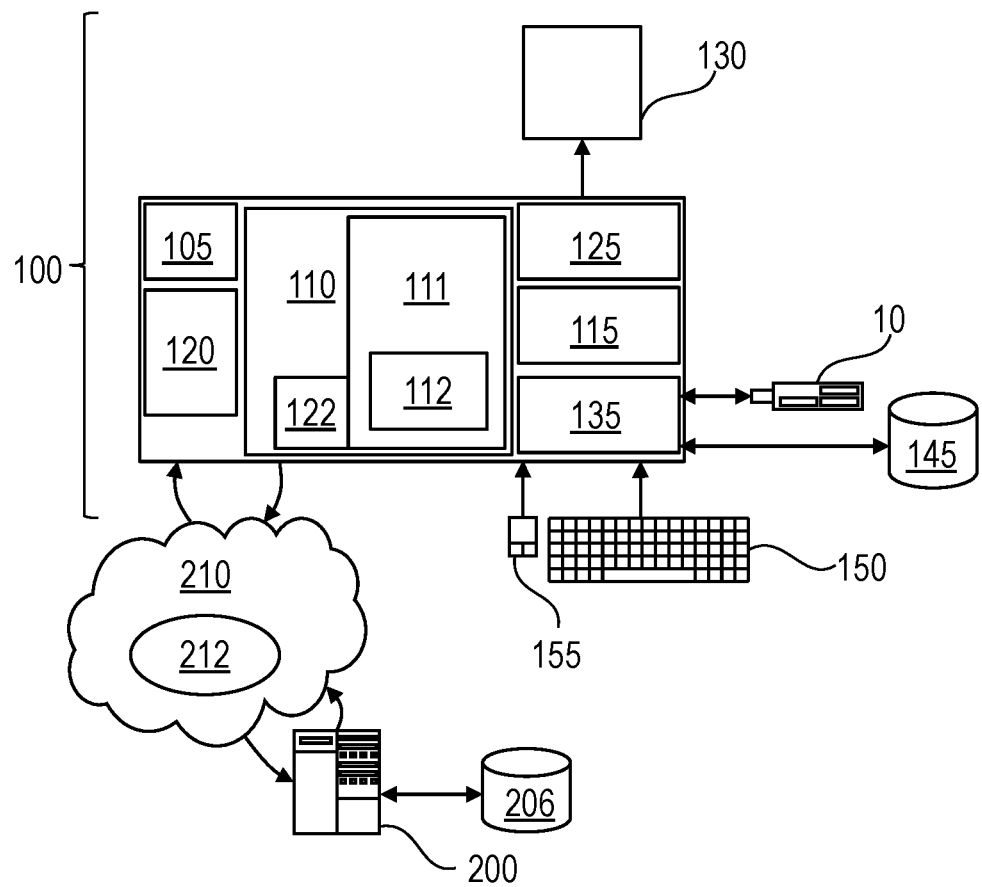
FIG. 1 depicts a schematic diagram illustrating an exemplary computer system according to an embodiment.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect of providing an efficient method for providing random sample documents from a corpus of documents accessed via a search engine. Unlike known approaches, embodiments do not depend on content-based search terms for retrieving documents, but rather on time-based search terms. The results of search queries and thus the sampling according to embodiments are independent on the content as well as on the length of the documents. In other words, an approach for acquiring documents is provided which is independent of document content as well as document size. Thus, no additional effort nor additional measurements are required for ensuring that the sampling is unbiased regarding content or size of the documents. Embodiments may be particularly beneficial in case the documents and/or the content of the documents comprises different types, like documents in different languages or formats or like multilingual documents.

Embodiments may have the beneficial effect that a random sampling is enabled without requiring a direct access to or ownership of the search index and/or corpus of documents. Nevertheless, embodiments may be independent of any ranking imposed by the search engine on the documents of the search results.

A random sampling or selection is a sampling/selection that contains no recognizable patterns or regularities to a particular (subjective) observer. While a random sampling/selection may, in fact, be truly random (i.e., objectively unpredictable, to the extent that such objective unpredictability can even be determined/measured), in many embodiments a random sampling/selection is simply a sampling/selection that adheres to a certain level of statistical randomness, algorithmic randomness, and/or pseudo-randomness, as generally known in the art (or to be known in the future).

A document may be any type of electronic file, e.g., a data file, a text file, an audio file, an image file or a video file. The random sample documents may be used for a statistical analysis on the corpus of documents. The sampling may be used to estimate characteristics of the documents of the corpus and/or characteristics of features or entities described by the data provided by the documents. Using a sampling may have the advantage of providing a more cost efficient and faster data collection than analyzing each document of the corpus. Each individual sample document is chosen randomly and substantially by chance, such that each document of the corpus may have the same probability of being chosen at any stage during the sampling process.

A search engine is a software system that is designed to carry out a search, e.g., a web search, on a corpus of documents in a systematic way for particular information specified in a search query. Search results may be presented in form of a list identifying documents satisfying search criteria defined by the search query used. The list may comprise pointers, e.g., links, to the respective documents of the corpus. A search engine may further be configured for crawling and/or indexing the corpus of documents. Indexing may comprise collecting, parsing, and storing data in form of an index to facilitate a fast and accurate information retrieval. The index may comprise pointers to each of the documents of the corpus.

Embodiments may be used to provide a risk assessment for a corpus of documents, like a large cloud data source, on how big the risk is that certain kind of data, e.g., sensitive data, is present in the corpus. In case of documents being data files, a statistical data analysis may be performed. Thus, an occurrence of specific events or a state of a system, like a production facility or a computer system, may be determined. The results of such a statistic analysis may be used for determining actions to be taken to prevent a risk and/or solve a problem. The results may be used for maintenance, i.e., servicing, repairing or replacing of necessary devices, equipment, machinery, building infrastructure, and supporting utilities. Results may in particular be used for predictive maintenance.

According to embodiments, the search engine interface is accessed via a network, like an intranet or the Internet. Unstructured data, like data provided via the World Wide Web, also referred to as the Web, is growing fast and managing the data becomes more and more a challenge. To enable efficient executions of queries on unstructured data search indexes are used. However, generating and maintaining a search index on a large set of unstructured data, particularly on a fast-growing set, may become complex, time consuming and expensive.

However, it is may not be possible to analyze all documents of an index in a timely manner, especially when the index contains millions of documents and operations executable on the index have time limits, e.g., due to general data protection regulation (GDPR). To be able to make a faster and/or more efficient decision, it may suffice to examine only a small representative portion of a large data set using statistical methods to draw a reasonable conclusion about the whole dataset, i.e. corpus of documents. However, in order to be able to retrieve random documents for statistical analysis, in general, an unrestricted access to the whole data set is required to be able to provide a true random sample. In case the dataset is accessed using a search index, unrestricted access to the search index is required. However, such an unrestricted access to the search index is in general reserved for the owner of the same. Embodiments may have the beneficial effect of enabling a generation of a truly random sample using an existing, e.g., public, search engine interface even in case of a restricted access.

Embodiments may have the beneficial effect of providing a random sample enabling an application, e.g., provided on a client device, to perform a statistical analysis using the random sample. Types of application that may need a random sample for statistical analysis may for example comprise applications working in the context of GDPR or sensitive data assessment. The random sample may, e.g., be used to check, whether a large document corpus is free of sensitive data, like credit card numbers, birth dates, social security numbers, etc. Other types of applications are risk assessment applications, that check the content of a large data set for any kind of risk using a small random sample, i.e., subset of data.

A bucket defines a set or range of parameters used to select documents comprising parameter values within the defined range. A time-based bucket defines a range of a time-based parameter, i.e., a time specification, used to select documents comprising time specifications within the defined range, i.e., time window. Thus, a set of time-based buckets may divide up a timeframe of a corpus into a plurality of time windows, each time window comprising a subset of documents of the corpus with time specifications within the respective time window.

According to embodiments, the definition of the time-based buckets is based on a time specification assigned to each document, e.g., a document creation time, publication time or last amendment time. In contrast, the definition of term-based buckets is based on lexical terms and/or combinations of lexical terms comprised by the documents, i.e., the content of the documents. Embodiments may have the beneficial effect that buckets once determined, e.g., based on document creation time or publication time, may be stable over time and may persist outside the search engine. Assuming that documents are added to the corpus and indexed by the search engine upon creation or publication, amendments of the corpus may be limited to a most recent period of time. The stock of older documents may remain constant and thus any definition of buckets for those documents may remain valid. Furthermore, much less queries may be required to get to a random sample which may reduce the load to the search engine and thus guarantee a faster determining of random samples.

According to embodiments, a given corpus of documents may be bucketed, i.e., the corpus is divided into a plurality of buckets. For a random sampling, a bucket may be randomly picked from this plurality of buckets and a document may be randomly selected from the randomly picked bucket.

According to embodiments, the buckets may satisfy the following requirements: The number of documents per bucket, i.e., the size of the buckets, may be smaller than a result number limit imposed on search results by the search engine. Time-based buckets of the same size may define time windows of different size, in case the density of documents within the respective time windows differs between each other. All buckets may have the same size such that each document in the corpus of documents has the same chance of being randomly selected. In case the buckets have different sizes, additional processing may be executed to ensure that each has the same chance of being randomly picked. When selecting randomly one of the documents of a bucket, additional rejection sampling may be performed for ensuring the mathematical correctness of the sampling process.

For a target distribution $d_1$, which is hard to sample from directly, rejection sampling may use an easy-to-sample-from trial distribution $d_2$ with samples from $d_2$ being employed to simulate sampling from $d_1$. Samples are repeatedly generated from a trial distribution $d_2$, until a sample is accepted. To decide whether a sample X is accepted, an acceptance-rejection procedure is applied. The acceptance-rejection accepts the sample X with an acceptance probability $p_{RS}$, referred to as acceptance function. The rejection sampling uses the acceptance-rejection procedure to bridge the gap between $d_2$ and $d_1$. When $d_1$ is a uniform distribution and $d_2$ some non-uniform distribution, the acceptance-rejection procedure assigns high acceptance probabilities to instances having low probabilities in $d_2$ and low acceptance probabilities to instances having high probabilities in $d_2$. Thus, the acceptance-rejection procedure smoothes the distribution $d_2$, such that for any $d_1$ and $d_2$, the distribution of the accepted samples is exactly the target distribution $d_1$.

Embodiments may have the beneficial effect of determining the buckets with a small number of queries. Preferably, the buckets are determined with as few queries as possible, since each query means load for the search engine and some search engines have query rate limits. This means that the number of queries allowed per predefined time interval is limited.

Embodiments may have the beneficial effect that the first time-based buckets, i.e., time-based buckets determined using search queries, may be used to predict further time-based buckets, i.e., the second time-based buckets. Not all the time-based buckets of the set of time-based buckets dividing up the timeframe of interest have to be determined using search queries. Just the first time-based buckets, i.e., a subset of the set of time-based buckets, are determined using search queries. Thus, the number of search queries to be sent to the search engine may be minimized. The first time-based buckets may be distributed, e.g., evenly or randomly, over the timeframe of interest. According to embodiments, predicted time-based buckets may be used, e.g., after having been tested successfully for accuracy, to predict more time-based buckets. According to embodiments, the predicted time-based buckets may have to satisfy a second predefined criterium in order to be used for further predictions.

Embodiments may have the beneficial effect that by checking during the random sampling whether the received search results satisfy the second predefined criterium, the determining of time-based buckets may be improved. For example, the time-based buckets may be improved. Thus, the quality of the prediction of the second time-based buckets may be checked and improved, if necessary. For example, a model used for prediction the second time-based buckets, like a machine learning model, may be improved. In case of a machine learning model, the machine learning model may be retrained using the improved time-based buckets as additional training data. According to embodiments, the first and second predefined criterium may be identical. According to embodiments, the first and second predefined criterium may be different.

According to embodiments, the algorithm for creating the bucketing is optimized in an initial bucketing phase in order to use as few queries as possible. The optimization may comprise the determining of the first time-based buckets and/or the checking of search result during sampling. According to embodiments, while retrieving random sample documents from the search engine, the time-based buckets may be further optimized over time to get a better distribution, e.g., by the checking of search result. Embodiments may have the beneficial effect of enabling to improve the definition of a time windows provided by the time-based buckets from which a random document is retrieved. Embodiments may have the beneficial effect of ensuring a better performance and less query load against the search infrastructure.

According to embodiments, the second predefined criterion defines a number of documents to be matched by the number of documents comprised by the search result. Embodiments may have the beneficial effect of ensuring that all the time-based buckets used for the random sampling provide search results comprise the same number of documents.

According to embodiments, the second predefined criterion defines a range of numbers by which the number of documents of the search result is to be comprised. Embodiments may have the beneficial effect of ensuring that all the time-based buckets used for the random sampling provide search results with numbers of documents within the same range.

According to embodiments, the adjusting of the time window comprises an adjusting of the width of the time window. The width of the time window is reduced, if the number of documents of the corpus with time-stamps within the time window is too large to satisfy the second predefined criterion, whereas the width of the time window is increased, if the number of the corpus with time-stamps within the time window is too small to satisfy the second predefined criterion. Embodiments may have the beneficial effect of providing an efficient way of adjusting the number of documents provided by search results based on time-based buckets such that each search result satisfies the second predefined search criterion.

According to embodiments, the method further comprises adjusting depending on the adjusting of the time window defined by the randomly selected time-based bucket at least the time windows defined by time-based buckets adjacent to the randomly selected time-based bucket. Embodiments may have the beneficial effect of further adjusting time-based buckets adjacent to the randomly selected time-based bucket. Thus, the adjustments are not restricted to a single time-based bucket, but may act on further time-based buckets. In case the width of the time window of the randomly selected time-based bucket is reduced, the widths of time windows of one or more adjacent time-based bucket may have to be adjusted as well to ensure that the full timeframe of interested is covered by the time windows defined by the time-based buckets and/or to ensure that search results based on the adjacent time-based buckets still satisfy the second predefined criterion. In case the width of the time window of the randomly selected time-based bucket is increased, the widths of time windows of one or more adjacent time-based bucket may have to be decreased to avoid overlapping time windows. In case the width of the time window of the randomly selected time-based bucket is decreased, the widths of time windows of one or more adjacent time-based bucket may have to be increased to ensure full coverage of the timeframe of interest. Furthermore, a decreasing or increasing of an adjacent time-based bucket may require further a compensation, i.e., increasing or decreasing, in order to ensure that the second predefined criterion is still satisfied.

Various algorithmic implementations of an efficient creation of time-based buckets may be possible. The algorithms described herein are only exemplary algorithms, while the present invention is not limited to these algorithms.

According to embodiments one or more of the following key features of the corpus of documents indexed by the search engine may be acquired: A total number of the documents comprised by the corpus, an oldest time specification assigned to one of the documents comprised by the corpus, or a most recent time specification assigned to one of the documents of the corpus. The total number of documents may be provided either in form of an actual number of documents currently compromised by the corpus or in form of an estimated number. Identifying the oldest time specification may comprise retrieving the oldest document comprised by the corpus, e.g., the document assigned with the oldest date of creation and/or the oldest date of publication. Identifying the most recent time specification may comprise retrieving the most recent document comprised by the corpus, e.g., the document assigned with the most recent date of creation and/or the most recent date of publication. For acquiring the aforementioned key features, like retrieving the oldest and the most recent document, suitable queries depending on the search engine capabilities may be used.

A sample pseudo-algorithm, exemplarily supported by machine learning, may comprise the following:

Set desired_accuracy=N1 (desired_accuracy is a threshold that, when reached, allows the process to terminate. Accuracy in this context may be seen as a quality measure of an ML model. After a train/test split of the available labeled dataset, e.g., the first subset of time-based buckets and the numbers of documents comprised by the first time-based buckets, the ML model is trained using the training sets resulting from the split and requested to provide predictions of numbers of documents in time-based buckets of test sets resulting from the split. The number of documents comprised by the correct predictions may be counted (given a certain tolerance for standard deviation or other kind of error measurement) and divided by the total number of documents in the test sets. For example, N1=90);

Set max_iterations=N2 (defines maximum number of iterations executed for extracting buckets, before machine learning is executed using extracted buckets, e.g., N2=50);

Set max_queries=N3 (defines maximum number of queries executed per iteration for extracting a bucket, e.g., N3=100);

Set bucket_size=N4 (defines intended number of documents per bucket, e.g., N4=20);

Set bucket_widths={ } (initializes an empty dictionary of bucket widths, with keys of a dictionary of bucket widths being time-stamps and values being time intervals, i.e., time windows, comprising the respective time-stamp for which a 'bucket_size' number of documents is retrieved if the respective time interval is used as a search parameter of a search query for selecting documents from the corpus);

```
Calibrate bucket width at a given time-stamp {
bucket_width (e.g., in minutes) = T if bucket_width is empty,
e.g., T = 60; else value of bucket width assigned to the
closest time-stamp from bucket_widths is determined
}
While max_iterations not exceeded {
While max_queries not exceeded {
generate a random time-stamp within a predefined
timeframe (the timeframe may be limited by
the oldest and the most recent time-stamp assigned to
documents comprised by the corpus);
construct a query with the time-stamp and time window=
calibrate( ) using the random time-stamp;
execute the query and find the number of documents in the
given time window=calibrate ( ) using
the random time-stamp;
determine a time interval comprising the random time-stamp
for which a 'bucket_size' number of
documents is retrieved;
}
Update the bucket_widths dictionary with the random
time-stamp and the determined time interval;
}
```

-continued

```
Compute the accuracy of the model, e.g., with an LSTM or
polynomial regression algorithm, using features such
as offset, day of year, day of week, time of day;
If accuracy > desired_accuracy stop.
```

According to embodiments, for each of the documents the time-stamp of the respective document specifies a time of generation, a time of publication or a time of a most recent amendment of the respective document. According to embodiments, each document comprises the time-stamp assigned to the respective document.

According to embodiments, the definitions of the time windows by the time-based buckets comprise a time specification within the time window, e.g., a point of time, and a width of the time window. The time specification may be a single point of time, like provided by a time-stamp comprising digital date and time information. The time information may comprise hours, minutes and/or seconds. According to embodiments, the time specification may be provided in form of a day of year, day of week, time of day. According to embodiments, the time specification may be provided in form of an offset from a present time and/or date.

According to embodiments, the time specification defines a start point of the time window. According to embodiments, the time specification defines an end point of the time window. According to embodiments, the time specification defining a center point of the time window.

According to embodiments, the first predefined criterion provides a predefined number of documents to be matched. Embodiments may have the beneficial effect of ensuring that the corpus comprises for each of the time windows the same number of documents with time-stamps within the respective time window. According to embodiments, the first predefined criterion provides a predefined range of numbers of documents to be matched. Embodiments may have the beneficial effect of ensuring that the corpus comprises for each of the time windows a number of documents with time-stamps within the respective time window, such that all the numbers of documents are within the same range. In other words, differences regarding the number of documents are limited for the different time-based buckets.

According to embodiments, the method further comprises determining a total number of documents comprised by the corpus. According to embodiments, the total number of documents comprised by the corpus is requested from the search engine interface. According to embodiments, the total number of documents comprised by the corpus is estimated using search queries comprising a combination of random search terms comprised by the documents of the corpus. Embodiments may have the beneficial effect that the total number of documents comprised by the corpus may be used for selecting the number of first time-based buckets, i.e., iterations, required to be determined in order to enable a suitable precis prediction of further time-based buckets. The lager the total number, the more first time-based buckets may be required to ensure a suitably precise prediction of the second time-based buckets. The smaller the total number, the less first time-based buckets may be required to ensure a suitably precise prediction of the second time-based buckets.

The total number of documents comprised by an indexed corpus of documents may for example be provided via an API of the search engine or estimated based on sample queries, e.g., as described by Z. Bar-Yossef and M. Gurevich, "Random sampling from a search engine's index", in Journal of the ACM, vol. 55, issue 5, article no. 24, 2008, by Z. Bar-Yossef and M. Gurevich, "Efficient search engine measurements", in Proceedings of the 16th International World Wide Web Conference (WWW), pages 401-410, 2007, or by A. Broder, M. Fontoura, V. Josifovski, R. Kumar, R. Motwani, S. Nabar, R. Panigrahy, A. Tomkins, and Y. Xu, "Estimating corpus size via queries," in Proceedings of CIKM, 2006, pages 594-630.

According to embodiments, the determining of the timeframe of interest comprises determining an oldest time-stamp assigned to the documents of the corpus. Furthermore, a most recent time-stamp assigned to the documents of the corpus is determined. The timeframe of interest is selected from the time interval spanned by the oldest and the most recent time-stamp. Embodiments may have the beneficial effect of providing a method for determining a maximum size for the timeframe of interest, i.e., the time interval spanned by the oldest and the most recent time-stamp.

For identifying the oldest document comprised by the corpus and thus the oldest time specification assigned to one of the documents, sample queries may be used. Furthermore, probing time frames, time sorting and/or result investigations may be used. The most recent document and thus the most recent time specification assigned to one of the documents may be identified using sample queries. Furthermore, probing time frames, time sorting and/or result investigations may be used.

According to embodiments, the timeframe of interest may be equal to the time interval spanned by the oldest and the most recent time-stamp. Embodiments may have the beneficial effect of using the maximum size possible for the timeframe of interest. According to embodiments, the timeframe of interest is shorter than the time interval spanned by the oldest and the most recent time-stamp. Embodiments may have the beneficial effect of enabling a usage of a timeframe of interest selected from time interval spanned by the oldest and the most recent time-stamp. Such a shorter timeframe of interest may require less computational effort for bucketing. The bucketing of the corpus of documents may be restricted to a specific timeframe of interest, i.e., only a subset of documents of the corpus assigned with a time-stamp within the respective timeframe may have to be taken into account for bucketing. For example, only documents of the last 10 years may be taken into account. The timeframe of interest may be defined by the application performing the statistical analysis. The timeframe of interest may depend on the statistical analysis to be performed.

According to embodiments, the adjusting of the first time window and the executing of a further search with an adjusted first search query with the adjusted first time window is repeated until either the first search result of the further search satisfies the first predefined criterion or a predefined maximum number of repetitions is reached. Embodiments may have the beneficial effect of ensuring that first time windows are determined for the first time-based buckets which satisfy the first predefined criterion, while avoiding to many repetitions, i.e., search queries. In case the predefined maximum number of repetitions is reached, the first time window not satisfying the first predefined criterion may be rejected and another first time window may be selected.

According to embodiments, the first time-windows may be selected randomly. According to embodiments, the first time-windows selected may be distributed evenly over the timeframe of interest.

According to embodiments, a maximum number of documents comprised by the search results is limited by a result number limit defined by the search engine. Thus, search engine result may be subject to a restriction that limits the maximum number of documents returned for a search query. A result provided by a search engine in reply to a search query may only comprise a small subset of all documents actually satisfying the search parameters defined for the query.

According to embodiments, the method may comprises determining the result number limit of the search engine. The first predefined criterion may be defined such that the number of documents comprised by the search result is required to be smaller than the result number limit in order to be able to satisfy the first predefined criterion. According to embodiments, the result number limit defined by the search engine is requested from the search engine interface. According to embodiments, the result number limit defined by the search engine is determined using test search queries. The result number limit may be of the order of 100 documents, e.g., 250, 500, 750, or more documents, e.g., 1000 documents.

Embodiments may have the beneficial effect of ensuring that a search query generated using a time-based bucket provides a search result comprising all the documents of the corpus with a time-stamp within the time window of the time-based bucket used.

According to embodiments, the adjusting of the first time window comprises an adjusting of the width of the first time window. The width of the first time window is reduced, if the number of documents of the corpus assigned with time-stamps within the first time window is too large for the search result to satisfy the first predefined criterion, whereas the width of the first time window is increased, if the number of documents of the corpus assigned with time-stamps within the first time window is too small to satisfy the first predefined criterion.

Embodiments may have the beneficial effect of providing an effective method for adjusting of the first time window such that the first predefined criterion is satisfied.

According to embodiments, the number of first time-based buckets comprised by the first subset of time-based buckets is smaller than the number of time-based buckets comprised by the set of time-based buckets. Embodiments may have the beneficial effect that the effort of determining time-based buckets using search queries, i.e. the first time-based buckets, may only have to be performed for a small part of the time-based buckets required for covering the whole timeframe of interest. The rest of the time-based buckets required may be predicted without requiring further search queries to be executed by the search engine.

According to embodiments, the method further comprises storing the first subset of time-based buckets. Embodiments may have the beneficial effect that the stored first subset of time-based buckets may be used for randomly selecting of time-based buckets during the sampling and/or for a bucketing of another timeframe of interest at least partly overlapping with the current timeframe of interest and/or for a later sampling.

According to embodiments, the predicting comprises at least one of an interpolation and an extrapolation. Embodiments may have the beneficial effect of providing an effective method for predicting second time-based buckets. For example, a regression model based on a regression analysis may be used for the prediction. For example, a time series analysis may be used. According to embodiments, the random selecting of a time-based bucket may comprise randomly selecting a point of time within the timeframe of interest, e.g., using a random number generator or a pseudo-random number generator, and using a prediction of a distribution of the widths of time windows to determine a time windows for the randomly selected point of time.

According to embodiments, the predicting may comprise a generating of a machine learning model trained for predicting the second time-based buckets. The generating of the machine learning model may comprise providing training sets using the first time-based buckets. Each training set comprises a time specification assigned to a first time window defined by the first time-based buckets as training input data and a width of the respective first time window as training output data. Furthermore, a learning algorithm may be executed on the training sets for generating the machine learning model.

Embodiments may have the beneficial effect of providing a machine learning model trained for effectively and efficiently predicting the second time-based buckets. Thus, no search queries are required to determine the second time-based buckets.

The term machine learning refers to a computer algorithm used to extract useful information from training data sets by building probabilistic models (referred to as machine learning models) in an automated way. The machine learning may be performed using one or more learning algorithms such as linear regression, K-means, classification algorithm, reinforcement algorithm etc. A model may for example be an equation or set of rules that makes it possible to predict an unmeasured value from other, known values. According to one embodiment, the machine learning model is a polynomial regression model or a deep learning model, e.g., an artificial recurrent neural network (RNN) like a long short-term memory (LSTM).

Polynomial regression is a form of regression analysis in which the relationship between the independent variable x and the dependent variable y is modelled as an nth degree polynomial in x. Polynomial regression fits a nonlinear relationship between the value of x and the corresponding conditional mean of y, i.e., $E(y|x)$.

According to embodiments, the predicting using the machine learning model further comprises providing first input data comprising a time specification to the machine learning model. The provided time specification is within the timeframe of interest, whereas the respective time specification is outside the first time windows defined by the first time-based buckets. In response to the providing of the first input data, first output data comprising a prediction of a second time-based bucket is received from the machine learning model defining a second time window with the time specification provided by the first input data. The second time window of the predicted second time-based bucket satisfies the first predefined criterion.

Embodiments may have the beneficial effect of predicting second time-based buckets to complement the first time-based buckets, such that a set of time-based buckets dividing up the whole timeframe of interest may be determined.

According to embodiments, the method further comprises storing the second subset of time-based buckets. Embodiments may have the beneficial effect that the second time-based buckets may be provided for the random selecting of the time-based bucket.

According to embodiments, the random selecting of the time-based bucket from the set of time-based buckets comprises providing second input data comprising a randomly selected time specification within the timeframe of interest to the machine learning model. In response to the providing of the second input data, second output data comprising the time-based bucket from the set of time-based buckets is received from the machine learning model defining the time window comprising the randomly selected time specification and satisfying the first predefined criterion.

Embodiments may have the beneficial effect that the first time-based buckets may not be required anymore as soon as the machine learning model is generated. The machine learning model may be used to predict a time-based bucket for any randomly selected time specification within the timeframe of interest. Thus, the random selecting of a time-based bucket may comprise randomly selecting a point of time within the timeframe of interest, e.g., using a random number generator or a pseudo-random number generator, and using the machine learning model to predict a suitable time-based bucket during sampling.

According to embodiments, for the random selecting of the time-based buckets the method further comprises determining third time-based buckets of a third subset of the set of time-based buckets. The determining of the third time-based buckets comprises acquiring one or more stored third subsets of time-based buckets. Embodiments may have the beneficial effect that stored time-based buckets, i.e., time-based buckets determined before, e.g., for another at least partly overlapping timeframe of interest. Thus, the respective time-based buckets do not have to be determined using search queries nor do they have to be predicted again. The respective time-based buckets may rather be retrieved from a local, a removable or a remote storage medium. According to embodiments, the number of third time-based buckets comprised by the one or more third subsets of time-based buckets is smaller than the number of time-based buckets comprised by the set of time-based buckets. According to embodiments, the third time-based buckets may be used together with the first time-based buckets to predict the second time-based buckets. According to embodiments, the third time-based buckets may be used to complement the first time-based buckets such that less the second time-based buckets have to be predicted. According to embodiments, the number of third time-based buckets comprised by the third subset of time-based buckets is equal to the number of time-based buckets comprised by the set of time-based buckets. Thus, all the time-based bucket from a set of time-based buckets may be provided by the stored third time-based buckets.

According to embodiments, the third subsets of time-based buckets each may divide up a continuous subsection of the timeframe of interest into a plurality of third time windows defined by third time-based buckets of the third subsets of time-based buckets.

According to embodiments, the computer program product further comprises machine-executable program instructions configured to implement any of the embodiments of the method for providing one or more random sample documents from a corpus of documents described herein.

According to embodiments, the computer system further is configured to execute any of the embodiments of the method for providing one or more random sample documents from a corpus of documents described herein.

FIG. 1 shows an exemplary computer system 100 configured for providing one or more random sample documents from a corpus 212 of documents using a search engine interface of a search engine provided by a server 200. The computer system 100 and the server 200 may communicate via a network 210, e.g., an intranet or the Internet. The corpus 212 of documents may be stored on storage media accessible via the network 210, e.g., on servers comprised by the network 210. Alternatively, the corpus 212 of documents may be stored on one or more storage media accessible by server 200, like local and/or remote storage media. It will be appreciated that the computer system 100 described herein may be any type of computerized system comprising a plurality of plurality of processor chips, a plurality of memory buffer chips and a memory. The computer system 100 may for example be implemented in form of a general-purpose digital computer, such as a personal computer, a workstation, or a minicomputer.

In exemplary embodiments, in terms of hardware architecture, as shown in FIG. 1, the computer system 100 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer system 100, a semiconductor-based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which comprises an ordered listing of executable instructions for implementing logical functions, notably functions involved in embodiments of this invention. For example, the executable instructions may be configured to generate and send search queries to the server 200 via the network 210 and receive search results. The executable instructions may further be configured for determining time-based buckets and/or providing one or more random sample documents from the corpus 212 of documents using a search engine interface provided by the search engine on the server 200. The software in memory 110 may further include a suitable operating system (OS) 111. The OS 111 essentially controls the execution of other computer programs, such as possibly software 112.

If the computer system 100 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer system 100 is activated.

When the computer system 100 is in operation, the processor 105 is configured for executing software 112 stored within the memory 110, to communicate data to and from the memory 110, and to generally control operations of the computer system 100 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 may be any generalized cryptographic card or smart card known in the art. The computer system 100 can further include a display controller 125 coupled to a display 130. In exemplary embodiments, the computer system 100 can further include a network interface for coupling to a network 210, like an intranet or the Internet. The network can be an IP-based network for communication between the computer system 100 and any external server, like server 200, other client and the like via a broadband connection. The network 210 transmits and receives data between the computer system 100 and server 200 providing a service catalog. In exemplary embodiments, network 210 may be a managed IP network administered by a service provider. The network 210 may be implemented in a wireless fashion, e.g., using wireless protocols and technologies, such as Wi-Fi, WiMAX, etc. The network 210 may also be a packet-switched network such as a local area network, wide area network, metropolitan area network, Internet network, or other similar type of network environment. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The server 200 may provide a search engine with a search engine interface configured for communicating with the computer system 100 via the network 210. The search engine may comprise a search index 206 indexing the corpus 212 of documents. The search index 206 may be stored on the server 200. Alternatively, the search index 206 may be stored on a local or remote storage medium accessible by the server 200. The search engine may be configured for crawling documents provided via the network 210, indexing the documents generating and updating search index 206 and/or searching indexed documents of the corpus 212 using the search index 206.

Figure 2:
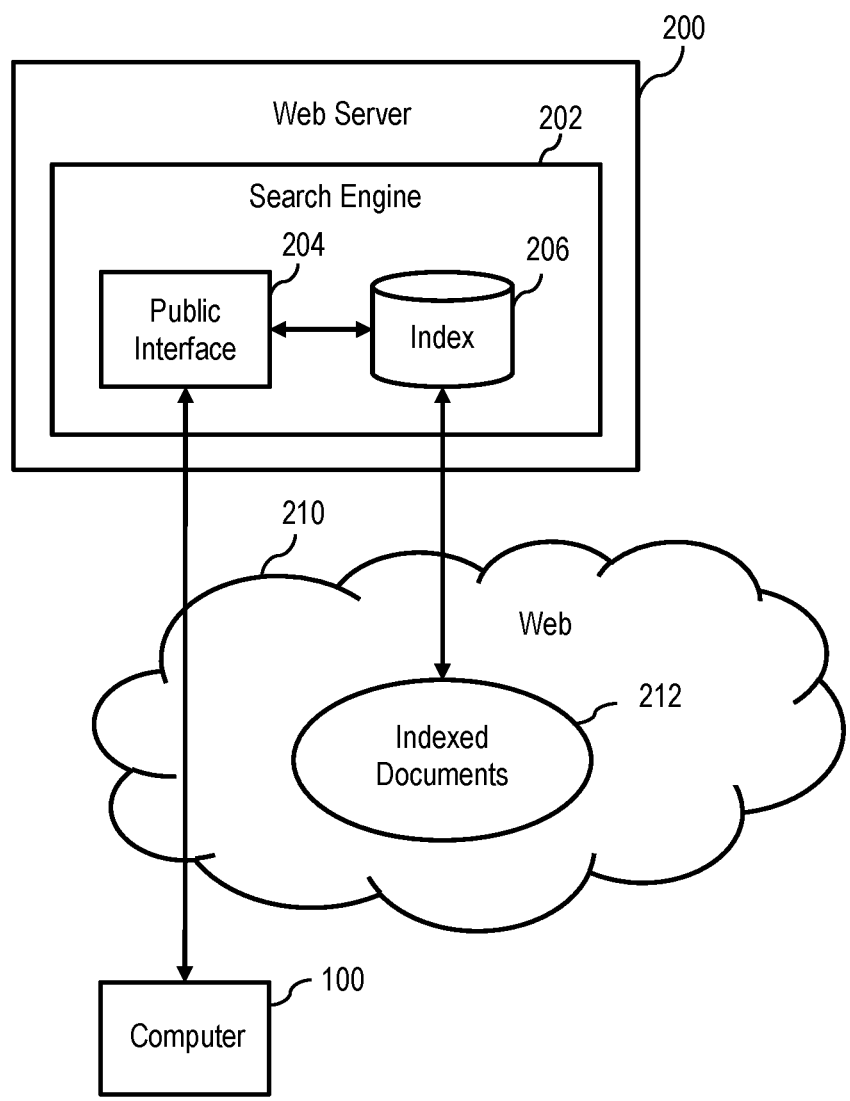
FIG. 2 depicts a schematic diagram illustrating an exemplary search infrastructure according to an embodiment.

FIG. 2 shows an exemplary search infrastructure comprising a computer system 100 configured to communicate with a server 200, e.g., a web server, via a digital telecommunications network 210, e.g., the World Wide Web. The computer system 100 may send search queries using a network interface to a search engine interface 204 of a search engine 202 provided by the server 200. The search engine interface 204 may, e.g., be a public interface. The search engine 202 may execute the search queries using a search index 206 indexing a corpus 212 of documents. The corpus 212 of documents may be provided on the network 210, i.e., by nodes of the network 210. The search engine 202 may identify documents comprised by the corpus 212 satisfying time-based search parameters defined by the search queries. The identified documents may be provided to the computer system 100 using a search result received from the server 200 via the network 210. The search result may comprise a list of the respective documents linked to the documents on the network 210. The computer system 100 may use the links to retrieve the respective documents of the search result from the network 210.

Figure 3:
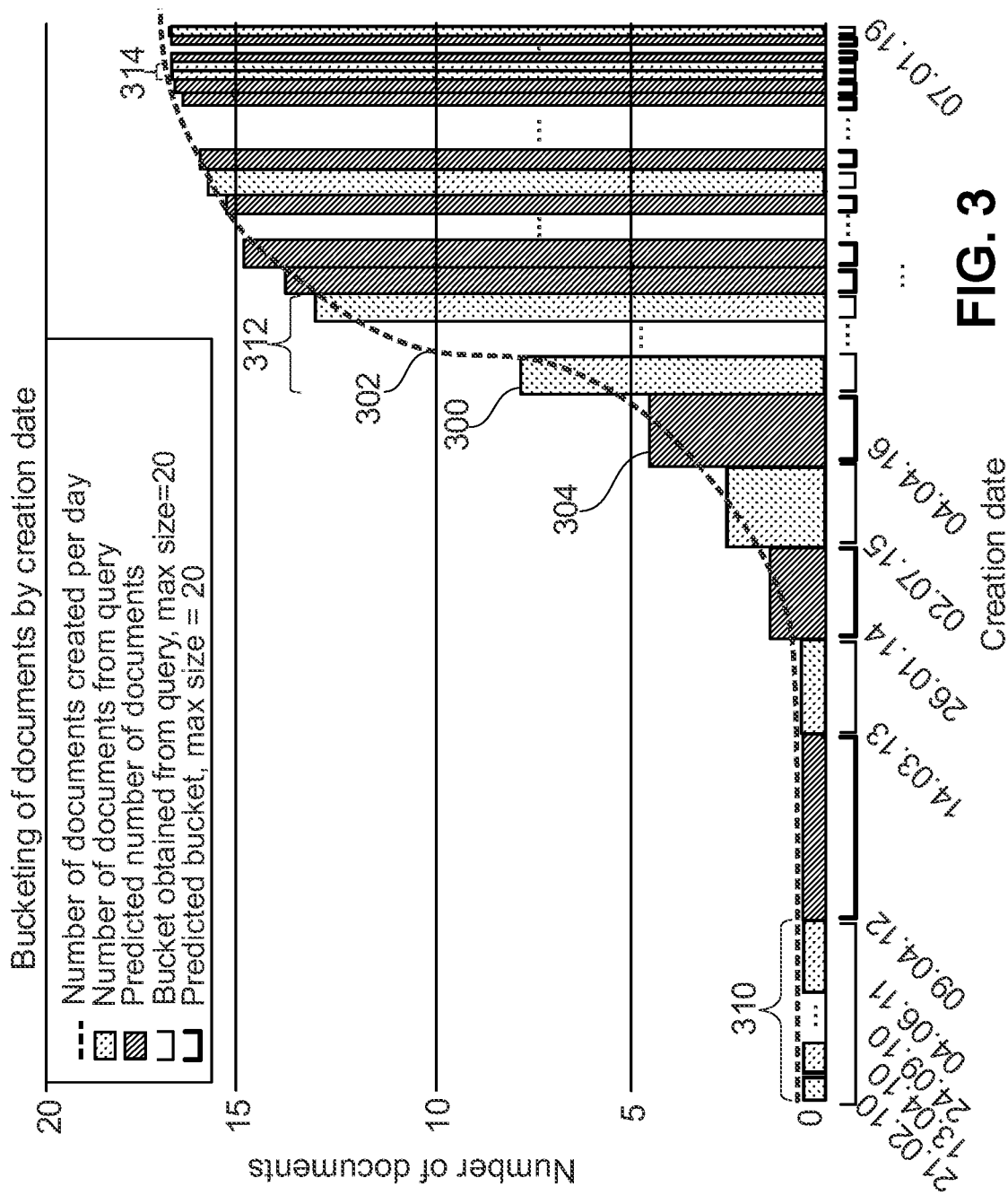
FIG. 3 depicts a schematic diagram illustrating an exemplary bucketing of documents according to an embodiment.

FIG. 3 illustrates an exemplary bucketing of documents by creation date. Each of the documents of a corpus of documents may be assigned with a time-stamp, e.g., identifying a date and/or time of creation of the respective document. A first set of time-based buckets 300 is obtained using search queries. Using the widths and sizes of these time-based buckets 300, i.e., the width of the time windows defined by the search queries and the numbers of documents comprised by the search results used to obtain the first time-based buckets, the number of documents 302 created, e.g., per day, over the timeframe of interest may be predicted, e.g., in the time from 21.02.2010 to 07.01.2019. As part of this prediction a second set time-based buckets 304 may be predicted to cover the whole timeframe of interest. The time-based buckets 300 obtained from queries as well as the predicted time-based buckets 304 may be limited to a maximum bucket size (max size) of $N_{max}$ documents, e.g., $N_{max}$=20. In other words, each time-based bucket 300, 304 may be required to satisfy a predefined criterion restricting the maximum number of documents comprised by the respective bucket. In case documents are distributed too sparse, the results of queries using adjacent time windows 310 as search parameters may be merge into a single time-based bucket. In other words, the width of the time-based bucket may be increased to cover the adjacent time windows 310. In case the documents are distributed too dense, the result of a query may be split into separate time-based buckets by splitting the time window 312, 314 used by the respective search query as a search parameter. In case the number of documents comprised by a time window 312 used as a search parameter of a search query becomes equal or larger than a result number limit imposed by the search engine, the width of the time window 312 may be reduced by splitting the time window 312 such that the numbers of documents comprised by the resulting narrower time windows are each smaller than the result number limit per search query. In case the number of documents comprised by a time window 314 used as a search parameter of a search query is larger than the predefined maximum bucket size, the time window 314 may be split such that the numbers of documents comprised by the resulting narrower time windows are each smaller than or equal to the predefined maximum bucket size. The adjusted first time-based buckets 300 may be used to predict the rate of documents 302 created over time, i.e., over the timeframe of interest. Based on the adjusted first time-based buckets 300 second time-based buckets 304 may be predicted such that they satisfy the predefined maximum bucket size, i.e., do not exceed the predefined maximum bucket size.

Figure 4:
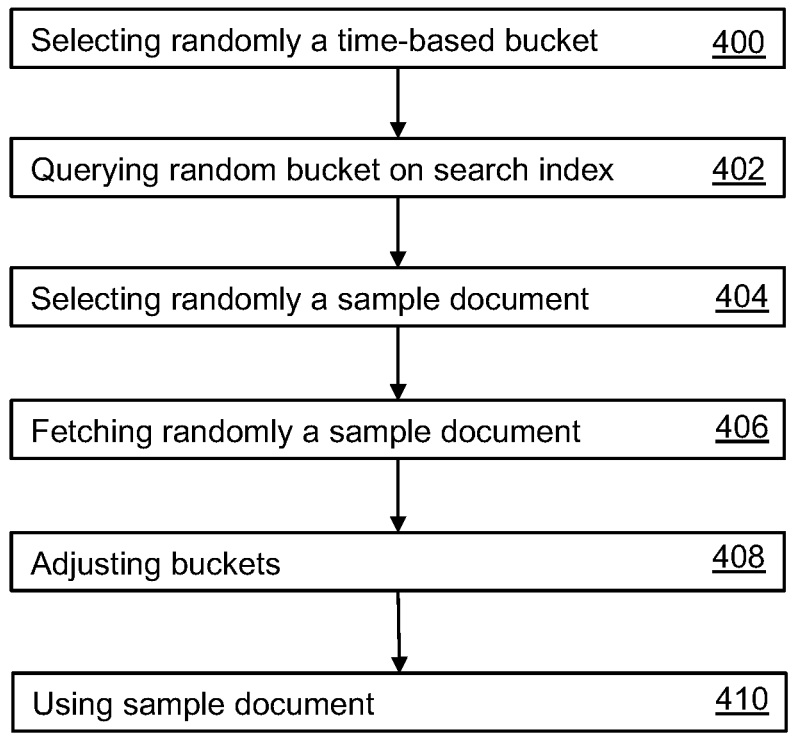
FIG. 4 depicts a schematic flow diagram of an exemplary method for providing a random sample document according to an embodiment.

FIG. 4 shows a schematic flow diagram of an exemplary method for providing a random sample document according to an embodiment. In step 400, a time-based bucket is selected randomly from a set of time-based buckets. For example, a random bucket number is chosen out of stored time-based buckets or a random time specification is chosen and a time-based bucket comprising the random time specification is determined, e.g., using a prediction model. In step 402, the randomly selected time-based bucket is queried on a search index using a search engine to receive a search result, e.g., comprising a result list for the time-based bucket with all the documents of a corpus comprised by the time window defined by the time-based bucket. In step 404, a document from the search result is selected randomly as the sample document. In step 406, the sample document is fetched from the corpus, e.g., using a link provided by the search result. In step 408, the time-based bucket selected in step 400 may optionally be adjusted with a left or right neighboring time-based bucket, if the selected time-based bucket is too small, or the respective time-based bucket may be split, if it is too large. Thus, a checking and adjusting of the time-based buckets may be executed on the fly during sampling. In case more sample documents are required, the steps 400 to 408 may be repeat until a suitable number of random sample documents has been fetched. In step 410, the sample documents are used, e.g., for statistical analysis, like risk assessment, risk management, error detection, error prediction, error analysis, maintenance and/or predictive maintenance. According to embodiments, the random selecting of the document may comprise using an additional rejection sampling for the mathematical correctness of the sampling process.

Figure 5:
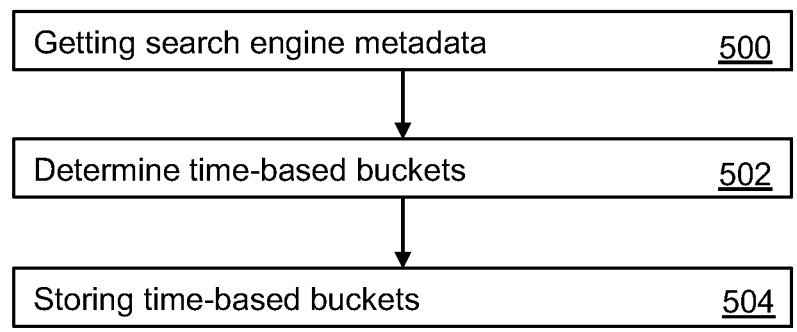
FIG. 5 depicts a schematic flow diagram of an exemplary method for determining time-based buckets according to an embodiment.

FIG. 5 shows a schematic flow diagram of an exemplary method for determining time-based buckets. In step 500, metadata of the search engine may be derived. The metadata may, e.g., comprise a number of documents comprised by the corpus, an oldest document of the corpus within the timeframe of interest, the most recent document of the corpus within the timeframe of interest, and/or a result number limit imposed on search query results by the search engine. In step 502, the set of time-based buckets is determined. Search queries with time windows as search parameters may be used which produce a result list that is smaller than the result number limit of the search engine used. Further details of step 502 are illustrated in FIG. 5. In step 504, time-based buckets for the whole timeframe of interest may be available and optionally stored outside the search engine to be used by an application, e.g., for random sampling of documents.

Figure 6:
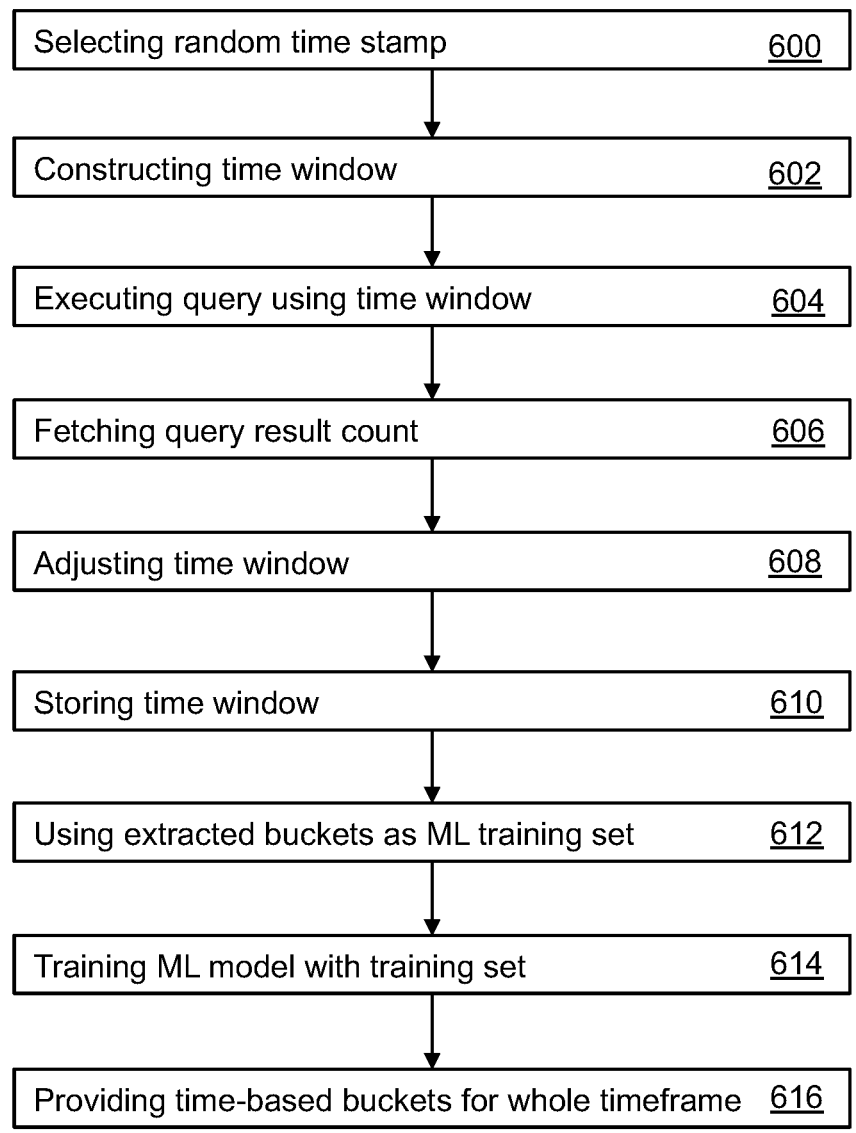
FIG. 6 depicts a schematic flow diagram of an exemplary method for determining time-based buckets according to an embodiment.

FIG. 6 shows a schematic flow diagram of an exemplary method for determining time-based buckets providing details of step 502 of FIG. 5. In step 600, a random time specification with a timeframe of interest is selected. In step 602, a time window is constructed for the selected time specification. The time specification may, e.g., define a start point, an end point or a center point of the time window. For the constructing of the time window, a predefined width or the width of one or more adjacent time-based buckets may be used. In step 604, a search query is generated using the time window of step 602 as a search parameter and the search query is executed against a search index by a search engine. In step 606, a search query result count is fetched, i.e., a number of documents comprised by the query result is determined. In step 608, the time window used for the search is adjusted to fit the query result size limit, i.e., to satisfy a predefined criterion regarding the number of documents, if necessary. The width of the time window may be enlarged, shrunken or kept. In step 610, the final time window, i.e., the time-based bucket, resulting from the adjusting of step 608 is stored. According to embodiments, the final time window buckets may be stored along with some metadata of the query result. The steps 604 to 608 may be repeated with the adjusted time window, until the adjusted time window satisfies the predefined criterion. The steps 600 to 610 may be repeated until a suitable number of time-based buckets has been determined using search queries. The required number of time-based buckets determined using search queries may depend on the total number of documents of the corpus within the timeframe of interest.

When a predefined limit of repetition and/or a suitable number of time-based buckets is reached, a prediction phase may be started predicting further time-based buckets using the time-based buckets determined with search queries. The prediction may comprise using a machine learning (ML) module generated and trained using the time-based buckets determined with search queries as a training set for the ML module in step 612. In step 614, the ML module is trained using the training set. In step 616, the trained ML module is used for predicting time-based buckets in order to provide time-based buckets for the whole timeframe of interest.

According to an embodiment, the determining of time-based buckets with search queries and the prediction of time-based buckets may be subsequent phases. According to alternative embodiments, an iterative method may be used. Predicted time-based buckets may be checked. In case the predicted time-based buckets satisfy the predefined criterion, e.g., the first or second predefined criterion, the prediction may be continued. In case the predicted time-based buckets do not satisfy the predefined criterion, the width of the time-based buckets may be adjusted and the predicted time-based buckets with the adjusted time-based buckets may be used as an additional training set for further training of the ML module in order to improve the prediction.

It is understood that one or more of the aforementioned embodiments of the invention may be combined as long as the combined embodiments are not mutually exclusive. Ordinal numbers, like e.g., 'first', 'second' and 'third', are used herein to indicate different element assigned with the same name, but do not necessarily establish any order of the respective elements. As far as it is technically and/or physically possible and reasonable, elements assigned with different ordinal numbers may according to embodiments be the same elements.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described are described in the following paragraphs.

Some embodiment of the present invention include a method for providing one or more random sample documents from a corpus of documents using a search engine interface of a search engine, the search engine comprising a search index indexing the corpus of documents, each of the documents of the corpus being assigned with a time-stamp, the method comprising: determining a timeframe of interest, providing the one or more random sample documents, the time-stamp of each of the random sample documents being within the timeframe of interest, the providing of each of the random sample documents comprising: selecting randomly a time-based bucket from a set of time-based buckets, the set of time-based buckets dividing up the timeframe of interest into a plurality of time windows, each of the time-based buckets defining one of the time windows, for each of the time windows the number of documents comprised by the corpus with time-stamps within the respective time window satisfying a first predefined criterion, sending to the search engine interface a search query for execution by the search engine using the search index, the search query defining a search for documents of the corpus with time-stamps within the time window defined by the randomly selected time-based bucket, in response to the sending of the search query, receiving from the search engine interface a search result, the search result comprising a set of all the documents of the corpus with time-stamps within the time window defined by the randomly selected time-based bucket, and selecting randomly one of the documents comprised by the received set of documents.

In some embodiments, the definitions of the time windows by the time-based buckets comprise a time specification within the time window and a width of the time window.

In some embodiments, the first predefined criterion provides a predefined number of documents to be matched.

In some embodiments, the first predefined criterion provides a predefined range of numbers of documents to be matched.

In some embodiments, the selecting of the timeframe of interest comprises: determining an oldest time-stamp assigned to the documents of the corpus, and determining a most recent time-stamp assigned to the documents of the corpus, the timeframe of interest being selected from the time interval spanned by the oldest and the most recent time-stamp.

In some embodiments, the timeframe of interest is equal to the time interval spanned by the oldest and the most recent time-stamp.

In some embodiments, the timeframe of interest is shorter than the time interval spanned by the oldest and the most recent time-stamp.

In some embodiments, for the random selecting of the time-based buckets, the method further comprises determining first time-based buckets of a first subset of the set of time-based buckets using first search queries, the determining of each of the first time-based buckets comprising: selecting a first time window within the timeframe of interest with a predefined width, generating a first search query defining a search for documents of the corpus with time-stamps within the first time window, sending to the search engine interface the first search query for execution by the search engine using the search index, in response to the sending of the first search query, receiving from the search engine interface a first search result, the first search result comprising a set of documents of the corpus with time-stamps within the first time window defined by the first search query, if the received first search result satisfies the first predefined criterion regarding the number of documents to be comprised by the time-based buckets, generating the first time-based bucket comprising a definition of the first time window used by the first search query, else adjusting the first time window and executing a further search using an adjusted first search query with the adjusted first time window.

In some embodiments, the adjusting of the first time window and the executing of a further search with an adjusted first search query with the adjusted first time window are repeated until either the first search result of the further search satisfies the first predefined criterion or a predefined maximum number of repetitions is reached.

In some embodiments, the adjusting of the first time window comprises an adjusting of the width of the first time window with the width of the first time window being reduced, if the number of documents of the corpus assigned with time-stamps within the first time window is too large for the search result to satisfy the first predefined criterion, and the width of the first time window being increased, if the number of documents of the corpus assigned with time-stamps within the first time window is too small to satisfy the first predefined criterion.

In some embodiments, the method further comprises storing the first subset of time-based buckets.

In some embodiments, for the random selecting of the time-based buckets, the method further comprises predicting second time-based buckets of a second subset of the set of time-based buckets, the second time-based buckets defining second time windows within the predefined timeframe using the first time-based buckets such that all of the predicted second time windows satisfy the first predefined criterion.

In some embodiments, the predicting comprises generating a machine learning model trained for predicting the second time-based buckets, the generating of the machine learning model comprising: providing training sets using the first time-based buckets, each training set comprising a time specification assigned to a first time window defined by the first time-based buckets as training input data and a width of the respective first time window as training output data, executing a learning algorithm on the training sets for generating the machine learning model.

In some embodiments, predicting using the machine learning model further comprises: providing first input data comprising a time specification to the machine learning model, the provided time specification being within the timeframe of interest, whereas the respective time specification being outside the first time windows defined by the first time-based buckets; and in response to the providing of the first input data, receiving from the machine learning model first output data comprising a prediction of a second time-based bucket defining a second time window with the time specification provided by the first input data, the second time window of the predicted second time-based bucket satisfying the first predefined criterion.

In some embodiments, the method further comprises storing the second subset of time-based buckets.

In some embodiments, the random selecting of the time-based bucket from the set of time-based buckets comprises: providing second input data comprising a randomly selected time specification within the timeframe of interest to the machine learning model, and in response to the providing of the second input data, receiving from the machine learning model second output data comprising the time-based bucket of the set of time-based buckets defining the time window comprising the randomly selected time specification and satisfying the first predefined criterion.

In some embodiments, for the random selecting of the time-based buckets, the method further comprises determining third time-based buckets of a third subset of the set of time-based buckets, the determining of the third time-based buckets comprising acquiring one or more stored third subsets of time-based buckets.

In some embodiments, the method further comprises checking whether the received search result satisfies a second predefined criterion regarding the number of documents comprised by the search result, if the second predefined criterion is not satisfied, adjusting the width of the time window defined by the randomly selected time-based bucket.

In some embodiments, the second predefined criterion defines a number of documents to be matched by the number of documents comprised by the search result.

In some embodiments, the second predefined criterion defines a range of numbers by which the number of documents of the search result is to be comprised.

In some embodiments, the adjusting of the time window comprises an adjusting of the width of the time window with the width of the time window being reduced, if the number of documents of the corpus with time-stamps within the time window is too large to satisfy the second predefined criterion, and with the width of the time window being increased, if the number of the corpus with time-stamps within the time window is too small to satisfy the second predefined criterion.

In some embodiments, the method further comprises adjusting depending on the adjusting of the time window defined by the randomly selected time-based bucket at least the time windows defined by time-based buckets adjacent to the randomly selected time-based bucket.

In some embodiments, the method further comprises performing a statistical analysis using the one or more random sample documents provided.

Some embodiments of the present invention include a computer program product comprising a non-volatile computer-readable storage medium having machine-executable program instructions embodied therewith for providing one or more random sample documents from a corpus of documents using a search engine interface of a search engine, the search engine comprising a search index indexing the corpus of documents, each of the documents of the corpus being assigned with a time-stamp, execution of the program instructions by a processor of a computer causing the processor to control the computer system to: determine a timeframe of interest; provide the one or more random sample documents, the time-stamp of each of the random sample documents being within the timeframe of interest, the providing of each of the random sample documents comprising: selecting randomly a time-based bucket from a set of time-based buckets, the set of time-based buckets dividing up the timeframe of interest into a plurality of time windows, each of the time-based buckets defining one of the time windows, for each of the time windows the number of documents comprised by the corpus with time-stamps within the respective time window satisfying a first predefined criterion, sending to the search engine interface a search query for execution by the search engine using the search index, the search query defining a search for documents of the corpus with time-stamps within the time window defined by the randomly selected time-based bucket, in response to the sending of the search query, receiving from the search engine interface a search result, the search result comprising a set of all the documents of the corpus with time-stamps within the time window defined by the randomly selected time-based bucket, and selecting randomly one of the documents comprised by the received set of documents.

Some embodiments of the present invention include a computer system for providing one or more random sample documents from a corpus of documents using a search engine interface of a search engine, the search engine comprising a search index indexing the corpus of documents, each of the documents of the corpus being assigned with a time-stamp, the computer system comprising a processor and a memory storing machine-executable program instructions, execution of the program instructions by the processor causing the processor to control the computer system to: determine a timeframe of interest; provide the one or more random sample documents, the time-stamp of each of the random sample documents being within the timeframe of interest, the providing of each of the random sample documents comprising: selecting randomly a time-based bucket from a set of time-based buckets, the set of time-based buckets dividing up the timeframe of interest into a plurality of time windows, each of the time-based buckets defining one of the time windows, for each of the time windows the number of documents comprised by the corpus with time-stamps within the respective time window satisfying a first predefined criterion, sending to the search engine interface a search query for execution by the search engine using the search index, the search query defining a search for documents of the corpus with time-stamps within the time window defined by the randomly selected time-based bucket, in response to the sending of the search query, receiving from the search engine interface a search result, the search result comprising a set of all the documents of the corpus with time-stamps within the time window defined by the randomly selected time-based bucket, and selecting randomly one of the documents comprised by the received set of documents.

What is claimed is:

1. A computer-implemented method comprising:
defining a set of time-based buckets based on a document creation time;
responsive to comprising two or more time-based buckets comprising the same size, defining a set of windows with different sizes based on the density of documents within a respective time window;
identifying a timeframe of interest, within the set of time-based buckets; and
providing one or more random sample documents from a corpus of documents, wherein the one or more random sample documents have respective time-stamps within the timeframe of interest, and wherein the providing of the one or more random sample documents includes:
dividing the timeframe of interest into the set of time windows, wherein for each of the time windows, the number of documents of the corpus with time-stamps within the time window satisfies a first predefined criterion;
selecting randomly a time window of the set of time windows;
determining a predetermined limit of documents comprised by a corpus, wherein the predetermined limit of documents is estimated using search queries comprising a combination of random search terms comprised by the documents of the corpus; and
receiving a search result from the search engine, wherein the search result identifies a set of documents with time-stamps within the time window.

2. The method of claim 1, further comprising:
sending a search query to a search engine, wherein the search engine includes a search index for the corpus of documents, and wherein the search query is for documents that have time-stamps within the time window, wherein the time window used for the search is adjusted to satisfy a predefined criterion regarding a number of documents.

3. The method of claim 1, further comprising:
selecting randomly a document from the set of documents identified in the search result.

4. The method of claim 1, wherein the dividing of the timeframe of interest into the set of time windows includes defining respective time windows based on a time specification within the time window and on a width of the time window, and wherein the first predefined criterion includes a predefined number of documents, and wherein the first predefined criterion includes a predefined range of numbers of documents.

5. The method of claim 1, further comprising determining the timeframe of interest, wherein determining the timeframe of interest includes:
determining an oldest time-stamp for the documents of the corpus;
determining a most recent time-stamp for the documents of the corpus; and
selecting the timeframe of interest from a time interval spanned by the oldest time-stamp and the most recent time-stamp.

6. The method of claim 5, wherein the timeframe of interest is the time interval spanned by the oldest time-stamp and the most recent time-stamp.

7. The method of claim 5, wherein the timeframe of interest is shorter than the time interval spanned by the oldest time-stamp and the most recent time-stamp.

8. The method of claim 1, wherein the random selecting of the time window further comprises:
selecting a first time window of a first subset of the set of time windows, wherein the first time window has a predefined width;
generating a first search query for documents that have time-stamps within the first time window;
sending the first search query to the search engine;
receiving a first search result from the search engine, wherein the first search result identifies a set of documents having time-stamps within the first time window; and
in response to the number of documents identified in the received first search result not satisfying the first predefined criterion, adjusting the first time window and executing a further search using an adjusted first search query with the adjusted first time window.

9. The method of claim 8, wherein the random selecting of the time window further includes repeating the adjusting of the first time window and the executing of the further search with the adjusted first search query with the adjusted first time window until a first search result of the further search satisfies the first predefined criterion.

10. The method of claim 8, wherein the random selecting of the time window further includes repeating the adjusting of the first time window and the executing of the further search with the adjusted first search query with the adjusted first time window until a predefined maximum number of repetitions is reached.

11. The method of claim 8, further comprising storing the documents having time-stamps within the first subset of the set of time windows in a first time-based bucket.

12. The method of claim 8, wherein the random selecting of the time window further includes predicting second time windows of a second subset of the set of time windows, wherein the predicting of the second time windows utilizes the first time windows such that all of the predicted second time windows satisfy the first predefined criterion.

13. The method of claim 12, wherein the predicting includes generating a machine learning model to predict the second time windows, wherein the generating of the machine learning model includes:
providing training sets using the first time windows, wherein each training set includes training input data and training output data, wherein the training input data includes a time specification for a first time window, and wherein the training output data includes a width of the first time window; and
executing a learning algorithm on the training sets to generate the machine learning model.

14. The method of claim 13, wherein the predicting further includes:
providing first input data including a time specification to the machine learning model, wherein the time specification of the first input data is within the timeframe of interest but outside of the first time windows; and in response to the providing of the first input data, receiving from the machine learning model first output data including a prediction of a second time window, wherein the second time window of the predicted second time window satisfies the first predefined criterion.

15. The method of claim 13, wherein the predicting further includes:
providing second input data including a randomly selected time specification to the machine learning model, wherein the randomly selected time specification is within the timeframe of interest; and
in response to the providing of the second input data, receiving from the machine learning model second output data including a prediction of a second time window, wherein the second time window of the predicted second time window satisfies the first predefined criterion.

16. The method of claim 12, further comprising storing the documents having time-stamps within the second subset of the set of time windows in a second time-based bucket.

17. The method of claim 12, wherein the random selecting of the time window further includes determining third time windows of a third subset of the set of time windows, wherein the determining of the third time windows includes acquiring one or more stored third time-based buckets.

18. The method of claim 1, further comprising:
checking whether the received search result satisfies a second predefined criterion regarding the number of documents identified by the search result; and
in response to the received search result not satisfying the second predefined criterion, adjusting the randomly selected time window.

19. The method of claim 18, wherein the second predefined criterion includes a number of documents.

20. The method of claim 18, wherein the second predefined criterion includes a range of numbers of documents.

21. The method of claim 18, further comprising adjusting the time windows adjacent to the randomly selected time window.

22. The method of claim 1, further comprising performing a statistical analysis using the one or more random sample documents.

23. A computer program product comprising a computer-readable storage medium having program instructions embodied therewith, the program instructions executable by one or more processors to cause the one or more processors to perform a method comprising:
responsive to comprising two or more time-based buckets comprising the same size, defining a set of windows with different sizes based on the density of documents within a respective time window;
identifying a timeframe of interest, within the set of time-based buckets; and
providing one or more random sample documents from a corpus of documents, wherein the one or more random sample documents have respective time-stamps within the timeframe of interest, and wherein the providing of the one or more random sample documents includes:
dividing the timeframe of interest into the set of time windows, wherein for each of the time windows, the number of documents of the corpus with time-stamps within the time window satisfies a first predefined criterion;
selecting randomly a time window of the set of time windows;
determining a predetermined limit of documents comprised by a corpus, wherein the predetermined limit of documents is estimated using search queries comprising a combination of random search terms comprised by the documents of the corpus; and
receiving a search result from the search engine, wherein the search result identifies a set of documents with time-stamps within the time window.

24. A computer system comprising:
one or more processors; and
a computer readable storage medium having program instructions embodied therewith, the program instructions executable by the one or more processors to cause the one or more processors to perform a method comprising:
responsive to comprising two or more time-based buckets comprising the same size, defining a set of windows with different sizes based on the density of documents within a respective time window;
identifying a timeframe of interest, within the set of time-based buckets; and
providing one or more random sample documents from a corpus of documents, wherein the one or more random sample documents have respective time-stamps within the timeframe of interest, and wherein the providing of the one or more random sample documents includes:
dividing the timeframe of interest into the set of time windows, wherein for each of the time windows, the number of documents of the corpus with time-stamps within the time window satisfies a first predefined criterion;
selecting randomly a time window of the set of time windows;
determining a predetermined limit of documents comprised by a corpus, wherein the predetermined limit of documents is estimated using search queries comprising a combination of random search terms comprised by the documents of the corpus; and
receiving a search result from the search engine, wherein the search result identifies a set of documents with time-stamps within the time window.

* * * * *